United States Patent
Kostka et al.

(10) Patent No.: US 7,541,386 B2
(45) Date of Patent: Jun. 2, 2009

(54) WETTING OF WATER REPELLENT SOIL BY LOW HLB EO/PO BLOCK COPOLYMERS AND ENHANCING SOLUBILITY OF SAME

(75) Inventors: Stanley J. Kostka, Cherry Hill, NJ (US); Paul Thomas Bially, Sewell, NJ (US)

(73) Assignee: Aquatrols Corporation of America, Inc., Paulsboro, NJ (US)

( * ) Notice: Subject to any disclaimer, the term of this patent is extended or adjusted under 35 U.S.C. 154(b) by 554 days.

(21) Appl. No.: 11/216,785

(22) Filed: Aug. 31, 2005

(65) Prior Publication Data

US 2005/0288389 A1 Dec. 29, 2005

Related U.S. Application Data

(63) Continuation of application No. 10/265,950, filed on Oct. 7, 2002, now abandoned.

(60) Provisional application No. 60/328,027, filed on Oct. 9, 2001.

(51) Int. Cl.
*C09K 17/00* (2006.01)
*C09K 17/42* (2006.01)
*B01D 12/00* (2006.01)
*B01F 17/42* (2006.01)
*A01G 31/00* (2006.01)

(52) U.S. Cl. ............... 516/203; 516/204; 516/916; 516/920; 47/58.1 R; 47/58.1 SC

(58) Field of Classification Search .......... 516/204, 516/203, 916, 920; 47/58.1 R, 58.1 SC
See application file for complete search history.

(56) References Cited

U.S. PATENT DOCUMENTS

| | | | |
|---|---|---|---|
| 2,867,944 A | 1/1959 | Fletcher | |
| 5,024,821 A | 6/1991 | Greenshields et al. | |
| 5,385,750 A | 1/1995 | Aleksejczyk et al. | |
| 5,468,718 A | 11/1995 | Burval et al. | |
| RE35,163 E * | 2/1996 | Christensen et al. | 507/107 |
| 5,595,957 A | 1/1997 | Bowey et al. | |
| 5,958,104 A | 9/1999 | Nonomura et al. | |
| 6,851,219 B2 * | 2/2005 | Kostka et al. | 47/58.1 SC |
| 2003/0073583 A1 * | 4/2003 | Kostka et al. | 504/362 |
| 2005/0272623 A1 * | 12/2005 | Kostka et al. | 510/267 |

FOREIGN PATENT DOCUMENTS

WO WO 98/39273 9/1998

* cited by examiner

*Primary Examiner*—Daniel S Metzmaier
(74) *Attorney, Agent, or Firm*—John A. Sheiden

(57) ABSTRACT

Water repellent soil is treated with low concentrations of EO/PO block copolymer having an HLB value of less than or equal to 2; an average molecular weight of greater than 3,000; and a percent hydrophile of 10 in order to rapidly increase the wetting rate of the water repellent soil.

6 Claims, No Drawings

WETTING OF WATER REPELLENT SOIL BY LOW HLB EO/PO BLOCK COPOLYMERS AND ENHANCING SOLUBILITY OF SAME

The present patent application claims the benefits accorded under 35 U.S.C. 119(e) of prior provisional application 60/328,027 filed 9 Oct. 2001 and is a Continuation of the prior patent application U.S. Ser. No. 10/265,950 filed 7 Oct. 2002 now abandoned.

FIELD OF THE INVENTION

The present invention generally relates to the use of certain block copolymer surfactants to enhance the infiltration of water and/or aqueous compositions through water repellent soil. More particularly, the present invention relates to the use of ethylene oxide-propylene oxide block copolymers to rapidly improve the hydrophilicity of such soil.

BACKGROUND OF THE INVENTION

Agriculturalists have to work with all types of plant growth media such as sand, natural earth, horticultural soils, and various soil-mimicking, soil-less plant culture substrates; however, the bane of essentially all agriculturalists is water repellent soil. Water repellent soil retards water infiltration into the soil matrix and often renders entire areas of the upper layers of the soil substrate essentially impervious to water penetration. Under rainfall or irrigation conditions, dire environmental consequences can result from the water repellency of the topsoil, such as surface runoff of water and aqueous compositions containing pesticides, this term inclusive of fertilizers, into pristine areas and/or potable reservoirs. Furthermore, and less obvious, are the serious consequences that result from aqueous pesticide flow through "fingers" that usually attend water repellent soil which can provide rapid transport of pesticide compositions to the local ground water table and thus increase the risk of ground water contamination.

Water repellency of a soil is not only a function of the initial water content of the soil, but is also a function of soil particle size (sands are more prone to water repellency than clays), as well as, type of organic matter incorporated in it. This organic matter induces water repellency in the soils in many ways, such as by providing hydrophobic organic substances leached from the plant litter; organic substances that have been irreversibly dried; and microbial by-products.

Before water will evenly infiltrate into or percolate through a soil matrix, there must be a continuous film of water on the soil particles. In other words, the soil must first be wetted before water will flow. In addition, getting the soil evenly wetted is of paramount importance to the healthy growth of plants or seeds which are to be grown in the soil. Thus, agriculturalists will often apply various wetting agent surfactant compositions directly to the soil or admix same with aqueous pesticide formulations to reduce the surface tension of the composition before applying the pesticide to the plant growth media as taught, for example, in U.S. Pat. Nos. 2,867, 944; 5,595,957; 5,385,750; WO 96/34078; and WO 98/39273.

"Although an increasing number of researchers are aware of the occurrence and consequences of water repellency in a wide range of soils, it is still a neglected field in soil science." (Dekker et al., International Turfgrass Society Research Journal, Volume 9, 2001, pages 498-505)

It has been recognized for years that in water repellent soil significant spatial variability can occur both in soil water content and degree of water repellency. Agriculturalists have attacked the soil water repellency problem through the use of wetting agent surfactant compositions. The degree of efficacy among chemistries and formulations have varied significantly. Often, the amount of surfactant required to ameliorate water repellency and/or to enhance infiltration, either perform variably or in an attempt to improve performance, higher rates of wetting agents are applied, such elevated rates often becoming injurious to plants.

Thus, there is a continuing search for wetting agent compositions with increased wetting rate that are able to quickly penetrate and infiltrate the water repellent soil. The use of wetting agent compositions with increased wetting rates, in turn, will result in a more effective wetting of the root zone during rain events and/or irrigation applications, thereby, inducing better plant growth and decreased run-off.

SUMMARY OF THE INVENTION

The instant invention provides a process for rapidly increasing the hydrophilicity and infiltration of water into water repellent soil matrices. The process consists of applying to the water repellent soil an effective amount of a wetting agent composition comprising certain specific ethylene oxide-propylene oxide (EO/PO) block copolymers with or without solubility enhancing additives. These compositions unexpectedly exhibit significantly enhanced infiltration (wetting) rates in water repellent soil.

DETAILED DESCRIPTION OF THE INVENTION

The instant invention specifically relates to the discovery that wetting agent compositions comprising ethylene oxide-propylene oxide (EO/PO) block copolymers having an HLB value of less than or equal to 2; an average molecular weight of greater than 3,000; and a percent hydrophile of less than or equal to 10 significantly and unexpectedly enhance water and aqueous composition transport or infiltration through the solid matrices of water repellent soil. Additionally, it has been found that these compositions are highly efficacious over a wide range of concentrations which is of critical importance in achieving maximum agronomic and/or hydrological benefit when the compositions are to be used in irrigation scenarios, e.g., both for the reduction in run-off and in the delivery of water soluble fertilizers.

The HLB (Hydrophilic-Lipophilic Balance) is a system designed to assign most surfactant materials a number which describes its hydrophilic or lipophilic tendencies. Surfactants that are more hydrophilic tend to have a higher HLB value. Conversely, lower HLB numbers denote a more hydrophobic surfactant composition.

The commonly accepted method of classifying the water repellency of soils is the Water Drop Penetration Time (WDPT) test (ibid.). In this test, drops of distilled water from a standard medicine dropper are placed on the smoothed solid surface of a soil sample, and the time that elapses before the drops are completely absorbed is determined. All WDPT tests are conducted under controlled conditions usually at a constant temperature of about 20° C. and a relative air humidity of about 50%. These tests are normally replicated three times.

Although soil water repellency is a relative property, varying in intensity, it is generally recognized in the art that a soil is to be considered water repellent if the WPDT exceeds five seconds. This allows soils to be qualitatively classified and referred to as being either wettable or water repellent. The instant invention is specifically directed to rapidly increasing the hydrophilicity of water repellent soil.

The ethylene oxide-propylene oxide (EO/PO) block copolymers of the instant invention include the straight block polymeric glycols obtained, for example, by the addition of ethylene oxide (EO) on a condensation product of propylene oxide (PO) with propylene glycol. Reverse block copolymers, which are also acceptable for use in the instant invention, are prepared by adding ethylene oxide to ethylene glycol to provide a hydrophile of designated molecular weight. Polypropylene oxide is then added to obtain hydrophobic blocks on the outside of the molecule. Reversing the hydrophobic and hydrophilic blocks creates surfactants similar to the regular EO/PO/EO block copolymers, but with some important differences. While the EO/PO/EO straight block copolymers tend to be better emulsifiers and dispersants and cover a broader range of molecular weights, the reverse block copolymers have lower foaming, greater defoaming, and reduced gelling tendencies. Additionally, reverse block copolymers are terminated by secondary hydroxyl groups, which have lower reactivity and acidity than the primary hydroxyl groups which terminate the EO/PO/EO straight block copolymers.

The tetra-functional block copolymers and their reverse counterparts, are derived from the sequential addition of propylene oxide and ethylene oxide to ethylene diamine.

Irrespective of the specific structural type, or configuration, as stated above, the EO/PO block copolymers which are useful in the instant invention are those having an HLB value of less than or equal to 2; an average molecular weight of greater than 3,000; and a percent hydrophile of less than or equal to 10.

The concentration of the wetting agent compositions of this invention in the aqueous formulations to be applied to the water repellent soil is not critical. Wetting agent composition levels of up to 200,000 ppm are contemplated in this invention for those concentrations are non-injurious to most plant. Thus, the concentration of the wetting agent in the compositions will range from about 200,000 to about 2 ppm; preferably from about 120,000 to about 5 ppm. One of the surprising features of the use of these wetting agent compositions is the outstanding effectiveness at very low concentrations: a highly desirable environmental property. In any event, appropriate concentration levels are easily determined by those skilled in the art.

By the term "effective amount" is meant that the amount of the EO/PO block copolymer in contact with the water repellent soil is such that there is a measurable increase in the wetting rate of the soil.

A simple laboratory "straw" test developed by Aquatrols Corporation of America can be used to record the initial effectiveness of a wetting agent composition on water repellent soil. (International Turfgrass Society Research Journal 7. Intertec Pubishing Corp. 1993 Chapter 67, pages 485-488) The straw test consists of taking clear plastic drinking straws (19 cm. in length and 0.5 cm. in diameter) and folding them in the center to give a sharp "V" shape, i.e., no flat crimps. Adhesive tape is used to hold the two arms of the straw in this "V" position. One arm of the straw is filled with hydrophobic soil while tapping the straw gently on a solid surface to ensure even settling of the soil in the straw. The resulting soil column is plugged with cotton and the straws arranged on a flat support. Test solutions at selected concentrations are introduced individually into each of the empty arms of the straws with a pasteur capillary pipet. The arm containing the hydrophobic soil column is laid horizontally on the support surface; the adhesive tape removed; and the arm containing the test solution lowered toward the support surface until the arm is at a 25° angle to the surface.

A wedge or support is fixed to the surface to ensure that the straw angle is maintained throughout the test. A stopwatch is started as soon as a test solution comes in contact with the hydrophobic soil and the time to wet a 6 cm. length of the soil column is recorded. Distilled water is usually used as a standard. This straw test is sensitive to concentrations as low as 10 ppm.

Other than in the operating examples, or where otherwise indicated, all numbers expressing quantities of ingredients or reaction conditions used herein are to be understood as modified in all instances by the term "about".

The following examples will further illustrate, but not limit, the invention with all percentages and ratios being by weight unless otherwise indicated.

EXAMPLE 1

The water repellent soil which is used in the following examples is made by coating a hydrophilic sand with octadecyl trichloro silane (OTS) as described by Bauters, et al., 1998 Soil Sci. Soc. Am. J. 62: 1185-1190.

Using the aforedescribed straw test, the infiltration rate in seconds of distilled water through a six centimeter column of this water repellent soil is determined through three replications. The results are set forth in Table I.

TABLE I

| Treatment | Replication 1 | Replication 2 | Replication 3 | Average |
|---|---|---|---|---|
| Distilled Water | 604,800 s | 691,200 s | 604,800 s | 633,600 s |

These numbers indicate the base-line hydrophobicity of this mineral soil and serve as the control in the quantification of the performance of wetting agent compositions tested.

Water droplet penetration time (WDPT) tests were also performed on this mineral soil in the following manner: The soil is evenly loaded into a deep container and the surface smoothed to realize a flat, unconsolidated substrate surface.

A 30 microliter drop of distilled water is placed on the sample surface. A stopwatch is started when the water drop contacts the soil surface and terminated when the drop is totally absorbed by the soil. The time is recorded in seconds.

The WDPT values obtained with the instant mineral soil prepared above all exceed six hours (21,600 sec) and thus this soil is extremely hydrophobic, i.e., clearly water repellent.

EXAMPLE II

Aqueous compositions of numerous EO/PO block copolymers in concentrations as indicated below are examined using the aforedescribed straw test in order to ascertain their ability to affect the infiltration wetting rate of the water repellent soil of Example 1. Tetronic is a trademark of BASF for its EO/PO ethylene diamine based block copolymers. Straight "L" block copolymers and reverse "R" block copolymers are produced by various manufacturers such as Rhodia, BASF, and Uniqema.

The results of the tests are set forth in Tables IIA and IIB below.

TABLE IIA

| Wetting Agent Composition | Total Concentration in Water (ppm) | | | |
|---|---|---|---|---|
| | 8000 | 6000 | 4000 | 2000 |
| | Infiltration Time (Sec.) | | | |
| Straight EO/PO Block Copolymers | | | | |
| L61 | 35.25 | 58 | 62.25 | 98.75 |
| L62 | 59 | 69.75 | 105.5 | 120 |
| L64 | 55.33 | 110.33 | 259 | 376.33 |
| L92 | 35 | 41.5 | 44.75 | 154.67 |
| L101 | 43.2 | 32.25 | 41 | 64 |
| Reverse EO/PO Block Copolymers | | | | |
| 31R1 | 80.5 | | | 1770.25 |
| 17R2 | 2183 | | | 100000 |
| 25R2 | 161.5 | | | 3640.67 |
| 10R5 | 100000 | | | 100000 |
| 17R4 | 100000 | | | 100000 |
| Diamine-Based EO/PO Block Copolymers | | | | |
| TETRONIC 304 | 100000 | | | 100000 |
| TETRONIC 701 | 3227 | | | 3568.75 |
| TETRONIC 901 | 166.25 | | | 14362.25 |
| TETRONIC 1301 | 42.5 | | | 86.25 |
| Diamine-Based EO/PO Reverse Block Copolymers | | | | |
| TETRONIC 90R4 | 82738.75 | | | 100000 |
| TETRONIC 150R1 | 43.5 | | | 50.50 |

TABLE II B

| | % Hydrophile | HLB Value | Average Molecular Weight |
|---|---|---|---|
| Straight Blocks (EO-PO-EO) | | | |
| L31 | 10% | 5 | 1,100 |
| L61 | 10% | 3 | 2,000 |
| L62 | 20% | 7 | 2,500 |
| L64 | 40% | 15 | 2,900 |
| L92 | 20% | 6 | 3,650 |
| L101 | 10% | 1 | 3,800 |
| Reverse Blcoks (PO-EO-PO) | | | |
| 25R2 | 20% | 4 | 3,100 |
| 31R1 | 10% | 1 | 3,250 |
| 17R2 | 20% | 6 | 2,150 |
| 10R5 | 50% | 15 | 1,950 |
| 17R4 | 40% | 12 | 2,650 |
| Tetra Blocks (EO-PO added to ethylenediamine) | | | |
| TETRONIC 304 | 40% | 16 | 1,650 |
| TETRONIC 701 | 10% | 3 | 3,600 |
| TETRONIC 901 | 10% | 3 | 4,700 |
| TETRONIC 1301 | 10% | 2 | 6,800 |
| TETRONIC 90R4 | 40% | 7 | 7,240 |
| TETRONIC 150R1 | 10% | 1 | 8,000 |

The above straw test results clearly show the outstanding and unexpected results realized in the increase in the infiltration rate when the EO/PO block copolymers of this invention at the concentrations tested are applied to water repellent soil.

It is observed from the above results that the soil wetting speed increases (wetting time decreases) with increasing hydrophobe molecular weight and decreasing HLB Value within each particular EO/PO block copolymer structural type, i.e., the straight EO/PO block copolymers; the reverse EO/PO block copolymers; the diamine-based EO/PO block copolymers; and the diamine-based EO/PO reverse block copolymers.

Stated another way, generally EO/PO surfactants with a lower HLB value and a higher average molecular weight show the shortest infiltration times through a column of hydrophobic soil. Furthermore, the HLB value is the dominant property with respect to the efficacy of wetting of the water repellent soil. The molecular weight property is a secondary characteristic in that if two surfactants were to have the same HLB value, the one with the higher molecular weight usually will realize enhanced wetting properties as compared to the lower molecular weight surfactant composition. This trend holds true for all four surfactant structural types.

Unfortunately, water solubility tends to decrease with increasing hydrophobe molecular weight and decreasing HLB value within each particular structural type. This behavior would possibly limit the use of some of these particular compounds to treat water-repellent soils especially if it were desired to formulate some in high concentrations, for if a stable aqueous solution cannot be produced, the material cannot be effectively and/or efficiently applied to soils.

Serendipitously, it has been discovered that by judiciously blending EO/PO block copolymers having high HLB values with the highly desirable, low HLB value block copolymers of the instant invention which, at the desired concentration, may possess poor water solubility if used alone, the overall solubility of the blend can be significantly enhanced while essentially retaining the greatly reduced infiltration time through water repellent soil.

EXAMPLE III

This example illustrates the use of a high HLB value EO/PO block copolymer to increase the solubility of an EO/PO block copolymer of the instant invention, i.e., one having an HLB value of less than or equal to 2; an average molecular weight of greater than 3,000; and a percent hydrophile of less than or equal to 10.

Tetronic 150R1 previously shown to exhibit strong efficacy in the wetting of water repellent soil shows poor water solubility which could limit its potential commercially. Antarox L64, a straight EO/PO block copolymer sold by Rhodia Inc., which has an HLB value of 15; an average molecular weight of 2,900; and a percent hydrophile of 40% is blended in a 1:1 weight ratio with the Tetronic 150R1. The wetting characteristics using the straw test of the individual components and the blend are set forth in Table III below. It should be noted that the data generated on a straight dilution of Tetronic 150R1 were based on a partially soluble test solution.

TABLE III

| COMPONENT/FORMULATION | Infiltration Time at 2000 ppm (s) |
|---|---|
| Tetronic 150R1 (BASF) | 50.5 |
| ANTAROX L64 (Rhodia) | 376.33 |
| 1:1 150R1 to L64 | 71 |

The results show that this surfactant blend of the low HLB value (1) Tetronic 150R1 and the high HLB value (15) Antarox L64 exhibits wetting times (71 seconds) very similar to the "target" compound Tetronic 150R1 alone (50.5 seconds). Furthermore, this blend at a concentration of 2,000 ppm is a uniform and room temperature stable, aqueous solution.

Also, it has been discovered that by adding the alkyl polyglycosides to the EO/PO block copolymers to prepare the blends of the instant invention, the cloud point of the blend can be raised above that of the block copolymer alone and, in some cases, solubility can even be induced to a previously essentially insoluble compound.

EXAMPLE IV

This example illustrates the surprising effect that alkyl polyglycosides have upon the cloud point and thus the solubility of the block copolymers, i.e., the four structural types, and thus the blends of this invention. EO/PO block copolymers Pluronic L121, Pluronic 31R1, Tetronic 1301, and Tetronic 150R1 are blended as indicated in the following weight percent table with AtPlus 452, the trademark for an alkyl polyglucoside sold by Unigema. These block copolymers have the lowest HLB values and the highest molecular weights of the commercially available compounds contained within each of the four structural surfactant types.

TABLE IV

|  | Cloud Point (° C.) (8000 ppm) | Cloud Point (° C.) (10% Solution) |
|---|---|---|
| Ratio of AtPlus 542:31R1 | | |
| 100% | | |
| 90% | 43 | 63 |
| 80% | 31 | 51 |
| 70% | 28 | 37 |
| 60% | 27 | 28 |
| 50% | 25 | 26 |
| 40% | 23 | 24 |
| 30% | 19 | 23 |
| 20% | 16 | 21 |
| 10% | 14 | 11 |
| 0% | 12 | 5 |
| Ratio of AtPlus 452:T150R1 | | |
| 100% | | |
| 90% | 30 | 45 |
| 80% | 25 | 39 |
| 70% | 21 | 24 |
| 60% | 19 | 22 |
| 50% | 18 | 20 |
| 40% | 17 | 19 |
| 30% | 15 | 17 |
| 20% | 16 | 15 |
| 10% | 17 | 10 |
| 0% | 9 | 2 |
| Ratio of AtPlus 452:L121 | | |
| 100% | | |
| 90% | 80 | 80 |
| 80% | 75 | 80 |
| 70% | 43 | 80 |
| 60% | 23 | 80 |
| 50% | 17 | 75 |
| 40% | 15 | 39 |
| 30% | 13 | 24 |
| 20% | 10 | 16 |
| 10% | 8 | 9 |
| 0% | 7 | 3 |
| Ratio of AtPlus 452:T1301 | | |
| 100% | | |
| 90% | 75 | 80 |
| 80% | 56 | 80 |
| 70% | 50 | 80 |
| 60% | 38 | 80 |
| 50% | 22 | 70 |
| 40% | 20 | 43 |
| 30% | 18 | 29 |
| 20% | 16 | 22 |
| 10% | 14 | 15 |
| 0% | 10 | 4 |

Thus, by using the polyglycosides/block copolymer blends of the instant invention, one can not only select the most efficacious block copolymer for maximizing the wetting effectiveness of a particular water repellent soil, but also use it at high concentrations and, by adjusting the polyglycoside: copolymer ratio produce a blend and concentrations with a cloud point well above anticipated application temperatures, i.e., produce a stable, water-soluble solution of the blends of this invention.

Alkyl polyglycosides are understood to be the reaction products of sugars and fatty alcohols, suitable sugar components being the aldoses and ketoses such as glucose, fructose, mannose, galactose, talose, gulose, allose, altrose, idose, arabinose, xylose, lyxose, lactose, sucrose, maltose, maltotriose, cellobiose, mellobiase, and ribose, which are referred to hereinafter as glycoses. Particularly preferred alkyl polyglycosides are alkyl glucosides by virtue of the ready availability of glucose. In its broadest sense, the term "alkyl" in alkyl polyglycoside is intended to encompass the residue of an aliphatic alcohol, preferably a fatty alcohol, obtainable from natural fats, i.e., saturated and unsaturated residues and also mixtures thereof, including those having different chain lengths. The terms alkyl oligoglycoside, alkyl polyglycoside, alkyl oligosaccharide and alkyl polysaccharide apply to alkylated glycoses of the type in which one alkyl radical in the form of the acetal is attached to more than one glycose residue, i.e., to a polysaccharide or oligosaccharide residue; these terms are generally regarded as synonymous with one another. Accordingly, alkyl monoglycoside is the acetal of a monosaccharide. Since the reaction products of the sugars and the fatty alcohols are generally mixtures, the term alkyl polyglycoside is intended to encompass both alkyl monoglycosides and also alkyl poly(oligo)glycosides.

Optionally, there can be a polyoxyalkylene chain joining the alcohol moiety and the saccharide moiety. The preferred alkoxide is ethylene oxide.

The higher alkyl polyglycosides express surfactant properties. By "higher alkyl polyglycoside" is meant a glycoside having an alkyl substituent that averages more than four carbon atoms in size.

The lipophilic groups in the alkyl polyglycosides are derived from alcohols, preferably monohydric for compatibilizer applications and should contain from 4 to 22, preferably 7 to 16 carbon atoms. While the preferred groups are saturated aliphatic or alkyl, there may be present some unsaturated aliphatic hydrocarbon groups. Thus, the preferred groups are derived from the fatty alcohols derived from the naturally-occurring fats and oils, such as octyl, decyl, dodecyl, tetradecyl, hexadecyl, octadecyl, oleyl and linoleyl, but groups may be derived from synthetically produced Ziegler alcohols or oxo alcohols containing 9, 10, 11, 12, 13, 14 or 15 carbon atoms. The alcohols of naturally-occurring fatty acids, typically containing an even number of carbon atoms and mixtures of alcohols, are commercially available such as mixtures of $C_8$ and $C_{10}$, $C_{12}$ and $C_{14}$, and the like. Synthetically-produced alcohols, for example those produced by an oxo process, contain both an odd and even number of carbon atoms such as the $C_9$, $C_{10}$, $C_{11}$ mixtures.

From their production, the alkyl polyglycosides may contain small quantities, for example 1 to 2%, of unreacted long-chain alcohol which does not adversely affect the properties of the surfactant systems produced with them.

Specifically, the preferred alkyl polyglycosides for use in the present invention are obtained by the reaction of alkanols with glucose or other mono- or di- or polysaccharides. Preferred alkyl polyglycosides for use in the present invention are the alkyl polyglucosides obtained by the reaction of glucose with a straight or branched chain alkanol or mixture of alkanols, for example, a mixture of alkanols containing 4 to 22, preferably 7 to 16 carbon atoms, for example, 8 to 10 carbon atoms. The number of glucose groups per alkyl group in the molecule may vary and alkyl mono- or di- or polyglucose or saccharide derivatives are possible. Commercial alkylpolyglucosides usually contain a mixture of derivatives having an average number of glycose groups per alkyl group (the Degree of Polymerization or D.P.) of between 1 and 4 for example, preferably from 1 to 2. A number of suitable alkylpolyglycosides are commercially available and include, for example, AL2042 (ICI); AGRIMUL 2069 and AGRIMUL PG 2067 (Cognis) and ATPLUS 438 and ATPLUS 452 (Uniqema).

Illustrative of the many processes available for the preparation of alkyl polyglycosides useful in the present invention are those disclosed in the following U.S. Pat. Nos. 4,950,743; 5,266,690; 5,304,639; 5,374,716; 5,449,763; and 5,457,190.

It is anticipated that the compositions of the instant invention be also utilized in solid form, e.g., powder or granular form, by either being added to inert filler material and/or blended with fillers and additives in methods well known by those skilled in the agrochemical water dispersible or dry spreadable art. In this way, the compositions are able to be delivered in solid form to the water repellent soil and controlled release of the compositions can be achieved if one so desires.

The metes and bounds of the instant discovery are as set forth in the following paragraphs.

What is claimed is:

1. A process for increasing the wetting rate of water repellent soil which comprises the steps of:
    i) preparing an aqueous wetting agent composition consisting of
        a) an ethylene oxide-propylene oxide block copolymer wherein the copolymer has an HLB value of less than or equal to 2; an average molecular weight of greater than 3,000; and a percent hydrophile of less than or equal to 10; and
        b) water; and
    ii) intimately contacting water repellent soil with an amount of said wetting agent composition such that the block copolymer will provide a measurable increase in the wetting rate of the soil.

2. The process of claim 1 wherein the total concentration of the block copolymer in the wetting agent composition is from 200,000 ppm to 2 ppm.

3. The process of claim 1 wherein the ethylene oxide-propylene oxide block copolymer is selected from the group consisting of:
    i) straight block polymeric glycols obtained by the addition of ethylene oxide (EO) on a condensation product of propylene oxide (PO) with propylene glycol;
    ii) reverse block polymeric glycols obtained by the addition of propylene oxide (PO) on a condensation product of ethylene oxide (EO) with ethylene glycol;
    iii) tetra functional block copolymers obtained by the sequential addition of initially propylene oxide and then ethylene oxide to ethylene diamine; and
    iv) tetra functional reverse block copolymers obtained by the sequential addition of initially ethylene oxide and then propylene oxide to ethylene diamine.

4. A process for increasing the wetting rate of water repellent soil which comprises the steps of:
    i) preparing a solid granular or powder wetting agent composition with the wetting agent consisting of an ethylene oxide-propylene oxide block copolymer wherein the copolymer has an HLB value of less than or equal to 2; an average molecular weight of greater than 3,000; and a percent hydrophile of less than or equal to 10 being added to inert filler material and/or blended with fillers and additives; and
    ii) contacting water repellent soil with an amount of said solid wetting agent composition such that the block copolymer will provide a measurable increase in the wetting rate of the soil.

5. A process for increasing the wetting rate of water repellent soil which comprises the steps of:
    i) preparing a solid granular or powder wetting agent composition with the wetting agent consisting of an ethylene oxide-propylene oxide block copolymer wherein the copolymer has an HLB value of less than or equal to 2; an average molecular weight of greater than 3,000; and a percent hydrophile of less than or equal to 10 being added to inert filler material and/or blended with fillers and additives;
    ii) adding said solid wetting agent composition to water to form an aqueous wetting agent composition; and
    iii) intimately contacting water repellent soil with an amount of said aqueous wetting agent composition such that the block copolymer will provide a measurable increase in the wetting rate of the soil.

6. A process for increasing the wetting rate of water repellent soil which comprises the steps of:
    i) preparing an aqueous wetting agent composition consisting of
        a) an ethylene oxide propylene oxide block copolymer wherein the copolymer has an HLB value of less than or equal to 2; an average molecular weight of greater than 3,000; and a percent hydrophile of less than or equal to 10;
        b) an ethylene-propylene oxide block copolymer having an HLB, value greater than 2 and an average molecular weight of from 2,000 to 8,000; and
        c) water; and
    ii) intimately contacting water repellent soil with an amount of said wetting agent composition such that the block copolymer having an HLB value of less than or equal to 2 will provide a measurable increase m the wetting rate of the soil.

* * * * *